United States Patent

Dupont et al.

[11] Patent Number: 5,816,615
[45] Date of Patent: Oct. 6, 1998

[54] ARTICULATION DEVICE FOR THE STEERING COLUMN OF AN AUTOMOBILE VEHICLE

[75] Inventors: Eddy Dupont; Jean-René Blais, both of Vendome; Charles Daviau, Sarge sur Braye, all of France

[73] Assignee: Lemforder Nacam SA, Vendome, France

[21] Appl. No.: 747,028

[22] Filed: Nov. 7, 1996

[30] Foreign Application Priority Data

Nov. 17, 1995 [FR] France .................................. 95 13761

[51] Int. Cl.⁶ ...................................................... B62D 1/16
[52] U.S. Cl. ............................................................ 280/780
[58] Field of Search .................... 280/775, 779, 280/780

[56] References Cited

U.S. PATENT DOCUMENTS

| | | | |
|---|---|---|---|
| 1,714,786 | 5/1929 | Hughes | 280/780 |
| 1,820,220 | 8/1931 | Geyer | 280/780 |
| 2,336,511 | 12/1943 | Stolte | 280/780 |
| 3,214,994 | 11/1965 | Tolan, Jr. | 280/780 |
| 3,300,229 | 1/1967 | Kishline | 280/780 |
| 4,895,391 | 1/1990 | Groat | 280/780 |

*Primary Examiner*—Kenneth R. Rice
*Attorney, Agent, or Firm*—Laubscher & Laubscher

[57] ABSTRACT

An articulation device for the steering column of an automobile vehicle includes a member joined to the steering wheel of the vehicle, a member joined to the structure of the vehicle, and a single member joining and disposed between the two above mentioned members. The single member is a spherical articulation member enabling axial displacement between the two above mentioned members and providing a seal between them.

11 Claims, 3 Drawing Sheets

ARTICULATION DEVICE FOR THE STEERING COLUMN OF AN AUTOMOBILE VEHICLE

BACKGROUND OF THE INVENTION

1. Field of the Invention

The present invention concerns a device for articulating a steering column of an automobile vehicle. The steering column of an automobile vehicle generally includes a part joined to the steering wheel, situated in the passenger compartment, and usually near the bulkhead separating the passenger compartment from the engine compartment. Additionally, it is necessary to have a system providing a seal between the engine compartment and the passenger compartment.

2. Description of the Prior Art

Some devices provide a double bolt fixing, with the bolts disposed along an axis perpendicular to the steering shaft. Each of these bolts carries a spring washer that is interposed with the structure, to enable some degree of articulation about this axis and the steering shaft.

Other prior art systems use a fixing about an articulation axis perpendicular to the steering shaft, with interposed spring washers, in order to enable an articulation about the fixing axis together with limited articulation about the steering shaft.

An elastic cup mounted on the steering shaft carrying a sealing and/or acoustical isolation bellows may be added to either of the above devices.

All these systems have the drawback of requiring an additional sealing assembly or do not allow articulation in all directions with a sufficient guarantee of reliability.

OBJECT OF THE INVENTION

The main object of this invention is to propose a device for articulating a steering column of an automobile vehicle that offers articulation in all directions together with freedom of movement in axial displacement, also providing a seal and acoustical isolation, with minimum overall dimensions and that is easy to fit to existing steering columns.

SUMMARY OF THE INVENTION

Accordingly, the device for articulating a steering column of an automobile vehicle comprises:

- a member joined to a steering wheel of the vehicle,
- a member joined to a structure of the vehicle, and
- a single member joining said member joined to the steering wheel and said member joined to the structure and disposed between them, said single member being a monobloc spherical articulation member enabling axial displacement between the two above mentioned members and providing an acoustical isolation between an engine compartment and a passenger compartment of the vehicle.

Furthermore, the articulation member according to the invention may include a system providing a seal between the engine compartment and the passenger compartment of the vehicle.

Advantageously, the articulation member embodying the invention is a monobloc articulation which includes an elastomer bush.

According to the invention, various embodiments of the articulation member are possible. In a first embodiment, the bush is mounted directly on the member joined to the steering wheel and in the member joined to the structure. In another embodiment, the bush is mounted directly on the member joined to the steering wheel, said bush having an exterior armature mounted in the member joined to the structure. There is provided in another embodiment that the bush is mounted directly in the member joined to the structure of the vehicle, said bush having an interior armature mounted on the member joined to the steering wheel. In another embodiment, the bush has an interior armature mounted on the member joined to the steering wheel, said bush having an exterior armature mounted in the member joined to the structure of the vehicle.

In a particular embodiment of the invention, the bush has an interior armature which is mounted on the body tube constituting the member joined to the steering wheel. This bush has an exterior armature mounted in the member joined to the structure. The bush and the interior armature are offset axially relative to the exterior armature and to a housing for the exterior armature made in the member joined to the structure to enable axial displacement of the member joined to the steering wheel of the vehicles In a variant of this embodiment, a bearing of steering shaft of the vehicle is mounted in the interior armature of the bush. The sealing system comprises a lip that radially extends the bush and that is pressed against the steering shaft to provide a seal between the engine compartment and the passenger compartment in the vehicle.

According to another embodiment of the invention particularly offering a reduced bulkiness, the bush has an exterior armature which is mounted in the member joined to the structure. This bush is mounted directly on the bearing of the steering shaft of the vehicle, and the exterior armature has a rim pressed against the end wall of the housing for the exterior armature made in the member joined to the structure. The bearing is mounted on the steering shaft by means of a ring. Furthermore, the sealing system comprises a lip that radially extends the bush and that is pressed against the ring disposed between the bearing and the steering shaft.

In all the embodiments of the invention described hereinabove, the member joined to the structure of the vehicle has a housing for the articulation member that is offset transversely relative to the transmission axis of the steering transmission axis, i.e. to the axis of points fixing said member joined to the structure on the structure.

Accordingly, the articulation device of the invention has the advantage of enabling angular adjustment in all directions of the steering column body relative to the member joined to the structure of the vehicle. Furthermore, this device allows free axial displacement between the steering column body and the member joined to the structure of the vehicle. It also accommodates axial movement of the steering pinion without loading the bearing. It further maintains acoustical isolation between the engine compartment and the passenger compartment of the vehicle. It further accommodates any mounting prestressing due to variations in structural parameters. Finally, it can assure the return of the column body to the angular nominal position by adaptation of the stiffness of the articulated member and/or a pre-load.

BRIEF DESCRIPTION OF THE DRAWINGS

The foregoing and other objects, features and advantages of the invention will be apparent from the following detailed description of several embodiments of the invention with reference to the corresponding accompanying drawings in which.

DESCRIPTION OF THE PREFERRED EMBODIMENTS

Figure 1:
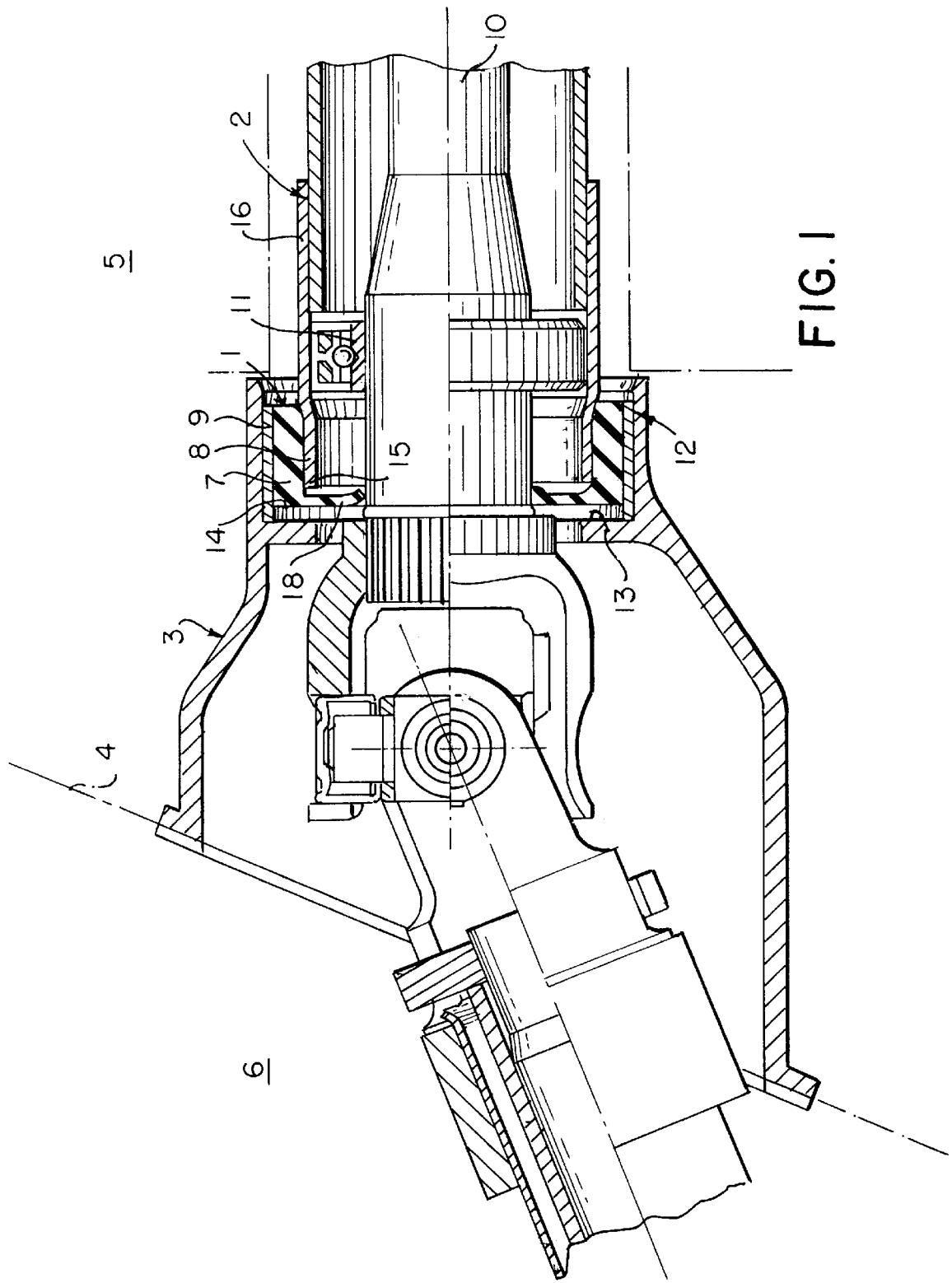
FIG. 1 is an axial section of the device of the invention for articulating a steering column of an automobile vehicle.

As can be seen in FIGS. 1 through 5, the device of the invention for articulating a steering column of an automobile vehicle includes:

a member 2 that is joined to the steering wheel of the automobile vehicle, a member 3 that is joined to the structure 4 of the automobile vehicle, a single member 1 that joins together the two members 2 and 3 and is disposed and operative between them.

The member 1 is a spherical articulation member that enables axial displacement between the two members 2 and 3 and additionally provides a seal between them and acoustical isolation between the engine compartment and the passenger compartment.

The device of the invention for articulating the steering column of a vehicle that is shown in FIG. 1, includes an articulation member 1 that is mounted on a member 3 joined to the structure 4 of the vehicle. The member 3 is constituted by a bowl that is fixed to a bulkhead forming part of the structure of the vehicle. The articulation member 1 is also mounted on a member 2 joined to the steering wheel of the vehicle and constituted by the body tube.

The articulation member 1 is a monobloc articulation which includes an elastomer bush 7. The bush 7 has an interior armature 8 attached to the bush 7. The bush 7 also has an exterior armature 9 attached to the bush 7. The exterior armature 9 is force fitted in a housing 12 made in the member 3 fixed to the structure 4. The exterior armature 9 is mounted so that it almost touches the back wall 13 of the housing 12. Furthermore the bush 7 and the interior armature 8 are disposed axially relative to the exterior armature 9 and to the end wall 13 of the housing 12, to enable axial displacement of the member 2 joined to the steering wheel of the vehicle. The interior armature 8 has an extension 16 which is force fitted over the body tube 2. A bearing 11 of the steering shaft 10 is mounted in the extension 16 of the interior armature. As can be seen opposite the housing end wall 13 in FIG. 1, an end 14 of the bush 7 and an end 15 of the interior armature 8 are offset axially relative to an end of the exterior armature 9.

Figure 2:
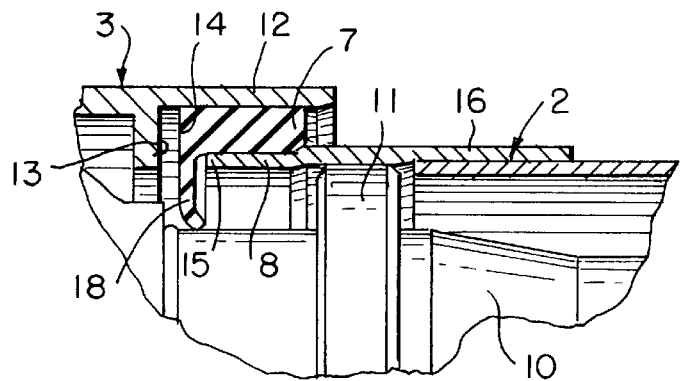
FIG. 2 is a partial sectional view of a variant of the FIG. 1 embodiment.

In the variant shown in FIG. 2 the articulation device includes an articulation member 1 that is in one piece with an elastomer bush 7. The bush 7 is mounted directly in the member 3 joined to the structure 4. The bush 7 also has an interior armature 8 which is mounted on the member 2 joined to the steering wheel and constituted by the body tube. Furthermore the end 14 of the bush 7 and the end 15 of the interior armature 8 are offset axially relative to the end wall 13 of the housing 12 to enable axial displacement of the member 2 joined to the steering wheel of the vehicle.

Figure 3:
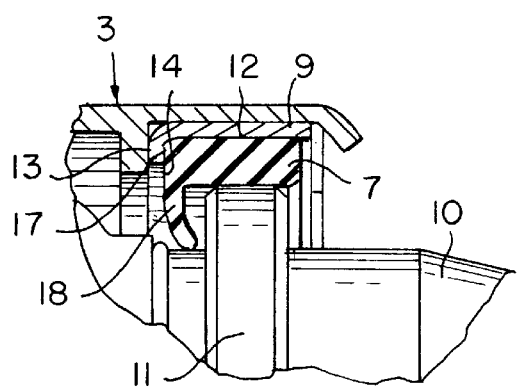
FIG. 3 is a partial sectional view of another variant of the FIG. 1 embodiment.

In the other variant of the invention shown in FIG. 3 the articulation member 1 is a monobloc member and includes an elastomer bush 7 which is mounted directly on the member joined to the steering wheel and constituted by the bearing 11. The bush 7 has an exterior armature 9 which is mounted in the member 3 joined to the structure 4. The end 14 of the bush 7 is offset axially relative to the exterior armature 9 and relative to the end wall 13 of the housing 12 to enable axial displacement of the member joined to the steering wheel of the vehicle.

Figure 4:
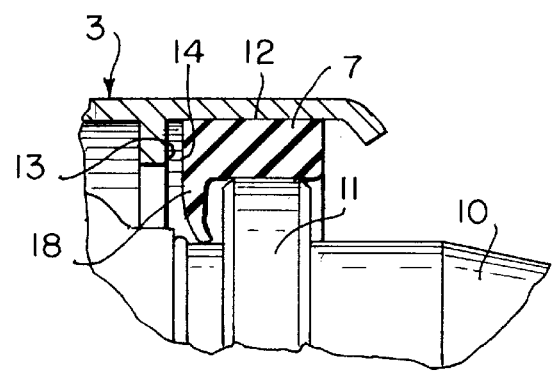
FIG. 4 is a partial sectional view of another variant of the FIG. 1 embodiment.

In the other variant of the invention shown in FIG. 4 the articulation member 1 is a monobloc member and includes an elastomer bush 7 which is mounted directly on the member joined to the steering wheel and constituted by the bearing 11. Furthermore, the bush 7 is also mounted directly in the housing 13 of the member 3 joined to the structure 4. In this variant the end 14 of the bush 7 is offset axially relative to the end wall 13 of the housing 12 to enable axial displacement of the member joined to the steering wheel of the vehicle.

All the embodiments of the invention shown in FIGS. 1 through 4 can include a system providing a seal between the engine compartment 6 and the passenger compartment 5 of the vehicle. This sealing system is constituted by a lip 18 that radially extends the bush 7. The lip 18 is pressed against the steering shaft 10 to provide a seal between the engine compartment 6 and the passenger compartment 5 of the vehicle.

Figure 5:
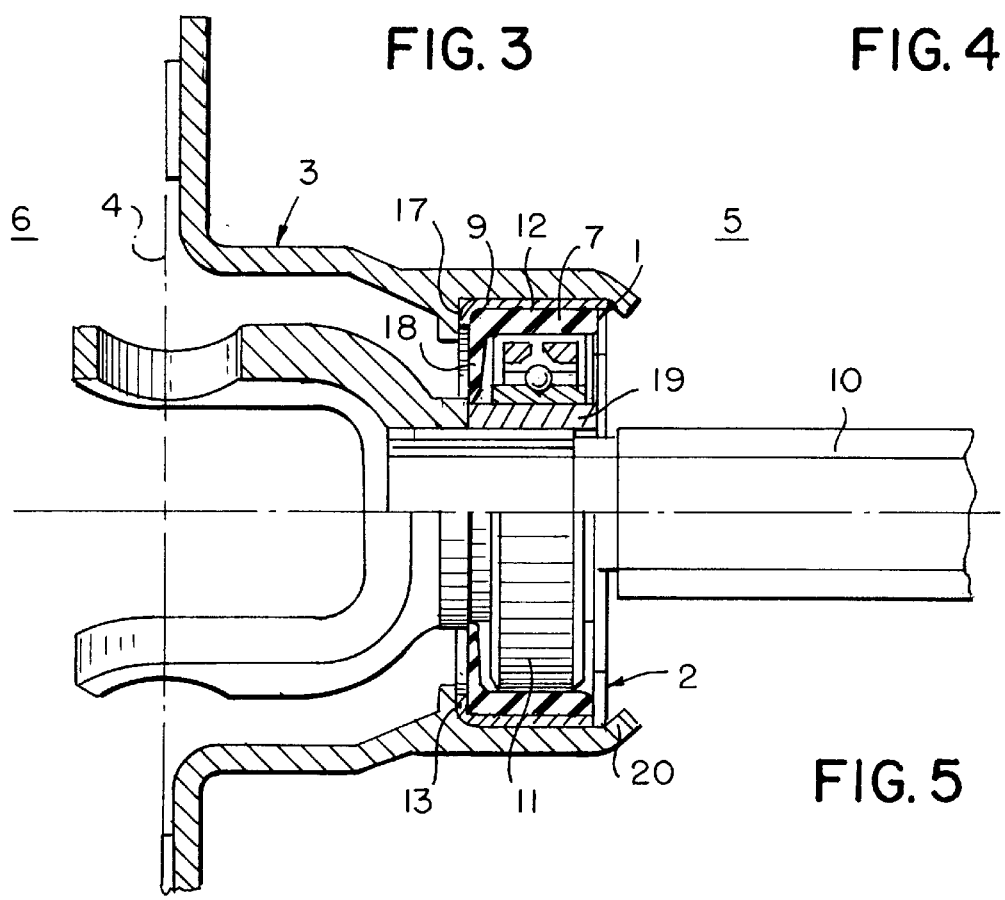
FIG. 5 is an axial section of another embodiment of the device of the invention for articulating a steering column of an automobile vehicle.

FIG. 5 shows another embodiment of the device of the invention for articulating a steering column of an automobile vehicle. In this configuration the articulation member 1 is a monobloc member and includes an elastomer bush 7. The bush 7 has an exterior armature 9 fastened to the bush 7. The exterior armature 9 is force-fitted in the member 3 joined to the structure 4. The member 3 is constituted by a bowl which is mounted on a cross member or a bulkhead that is part of the structure of the automobile vehicle. The exterior armature 9 includes a rim 17 that is pressed against the end wall 13 of the housing 12 of the member 3 joined to the structure 4. The exterior armature 9 is force-fitted in the housing 13 and the assembly is held in place by a rim 20 on the member 3. The bush 7 is mounted directly on the bearing 11 of the steering shaft 10, said bearing 11 being fastened to the bush 7. The bearing 11 is mounted on the steering shaft 10 by means of a ring 19. Accordingly, the member of the invention joined to the steering wheel is constituted in this case by the bearing 11. A lip 18 radially extends the bush 7 and is pressed onto the ring 19, which is disposed between the bearing 11 and the steering shaft 10. The lip 18 therefore provides a seal between the engine compartment 6 and the passenger compartment 5 of the vehicle.

Figure 6:
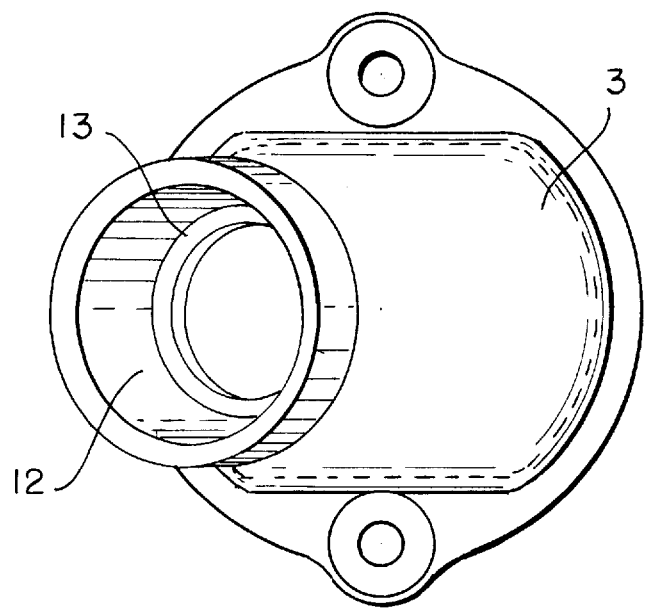
FIG. 6 shows one embodiment of the member joined, in accordance with the invention, to the structure of the vehicle.
Figure 7:
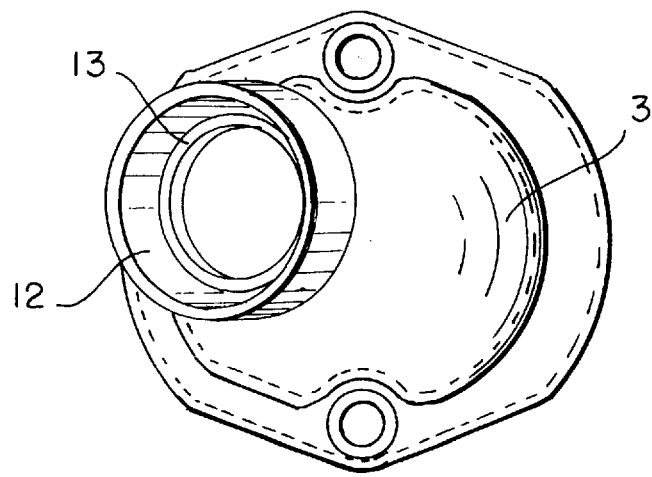
FIG. 7 shows another embodiment of the member joined to the structure of the vehicle.

FIG. 6 shows one embodiment of the member 3 joined to the structure 4 of the vehicle and constituted by a bowl. The member 3 includes a housing 12 with an end wall 13 which is mounted on the steering shaft. FIG. 7 shows another embodiment of the member 3 joined to the structure 4 of the vehicle. In this configuration the member 3 has a housing 12 with an end wall 13 that are offset transversely to the axis of fixing points of the member 3 on the structure 4. Accordingly, the device of the invention for articulating a steering column of an automobile vehicle has the additional advantage of accommodating mounting prestresses due to differences in fixing parameters. Further, it caters for right-hand drive as well as for lefthand drive in situations in which the steering column axes are not perpendicular to the cross member. Finally, it accommodates concentricity defects.

What we claim is:

1. An articulation device (1) for supporting the steering shaft (10) of a vehicle for rotational and axial displacement relative to an opening contained in a divider wall (4) that separates the engine and passenger compartments of the vehicle and through which the steering shaft extends, comprising:

(a) vehicle steering means (2) including a steering shaft (10) extending through the divider wall opening;

(b) an annular connecting member (3) arranged in concentrically spaced relation about said steering shaft, said connecting member being adapted for connection at one end with the divider wall; and (c) annular support means (1) supporting said steering shaft for rotational and limited axial displacement relative to said connecting member, said support means including an annular resilient monobloc spherical articulation bush (7) arranged concentrically between said steering means and said connecting member said bush including an internal annular lip seal portion (18) that extends radially inwardly into sealing engagement with said steering means.

2. The articulation device claimed in claim 1, wherein said connecting member includes at its other end an annular housing portion (12) having an internal recessed annular wall (13), said bush being normally axially spaced from said internal wall.

3. An articulation device as defined in claim 1, wherein said resilient seal means is formed of an acoustical damping material, thereby to isolate the passenger compartment of the vehicle from engine noise.

4. The articulation device claimed in claim 1, wherein said articulation member bush is formed from an elastomer.

5. The articulation device claimed in claim 4, wherein said connecting member includes at its other end an annular housing (12) having a recessed annular internal wall (13): wherein said support means includes a ring (19) mounted on said steering shaft and a bearing (11) mounted on said ring said bush being mounted directly on said bearing and including an exterior armature (8) mounted within said housing and including a rim portion (17) abutting said internal housing wall said lip seal portion being in sealing engagement with said ring.

6. The articulation device claimed in claim 4 wherein said bush is mounted directly on said steering means and within said connecting member.

7. The articulation device claimed in clain 4, wherein said bush is mounted directly on said steering means, said bush having an exterior armature (9) mounted in said connecting member.

8. The articulation device claimed in claim 4, wherein said bush is mounted directly in said connecting member, said bush having an interior armature (8) mounted on said steering means.

9. The articulation device claimed in claim 4, wherein said bush has an interior armature (8) mounted on said steering means, said bush having an exterior armature (9) mounted in said connecting member.

10. The articulation device defined in claim 4, wherein said steering means includes a tubular body tube; wherein said connecting member includes at the other end an annular housing portion (12); and further wherein said bush has an interior armature (9) mounted on said body tube, said bush having an exterior armature (8) mounted in said housing portion, said bush and said interior armature being offset axially relative to said exterior armature and said housing portion thereby enabling axial displacement of said body tube.

11. The articulation device claimed in claim 10, wherein a said steering means includes a bearing mounted in said interior armature of said bush.

* * * * *